Dec. 6, 1955                N. G. BUSCH              2,726,362

ELECTRIC MOTOR AND SWITCHING MECHANISM THEREFOR

Filed June 29, 1953                                   2 Sheets-Sheet 1

INVENTOR.
NORMAN G. BUSCH
BY Walter C. Kelsey
ATTORNEY

Dec. 6, 1955  N. G. BUSCH  2,726,362
ELECTRIC MOTOR AND SWITCHING MECHANISM THEREFOR
Filed June 29, 1953  2 Sheets-Sheet 2

INVENTOR.
NORMAN G. BUSCH
BY Walter C. Kelsey
ATTORNEY

United States Patent Office 2,726,362
Patented Dec. 6, 1955

2,726,362
ELECTRIC MOTOR AND SWITCHING MECHANISM THEREFOR

Norman G. Busch, Columbia Station, Ohio, assignor to Air Controls, Inc., Cleveland, Ohio Application June 29, 1953, Serial No. 364,670

2 Claims. (Cl. 318—202)

This invention relates to an electric motor and switching mechanism therefor, and more particularly, provides a construction whereby changes in direction of rotation and speed of rotation of a motor may be accomplished by a single switching means.

The use of electric motors to operate fans in such manner that the direction of rotation thereof may be accomplished by a single switch is well known in the art. Likewise, to provide a separate switch to control the speed of motor rotation is well known. I have discovered that by using an electric motor having certain windings and associated parts, a single switch operated as herein described will control both the direction of rotation and the speed thereof.

Therefore, an object of this invention is to provide a single switch, which in cooperation with the features disclosed herein, will control both the direction of rotation and the speed of rotation of an electric motor adapted to operate a fan or the like.

Other objects are to provide means for accomplishing the foregoing which are relatively simple, readily installed, adapted to be installed at a relatively low cost, and are durable and positive in operation.

These and other objects will occur in the course of the following specification. In the drawings forming a part of this specification, an embodiment of this invention is illustrated in brief diagrammatic form;

Figure 1:
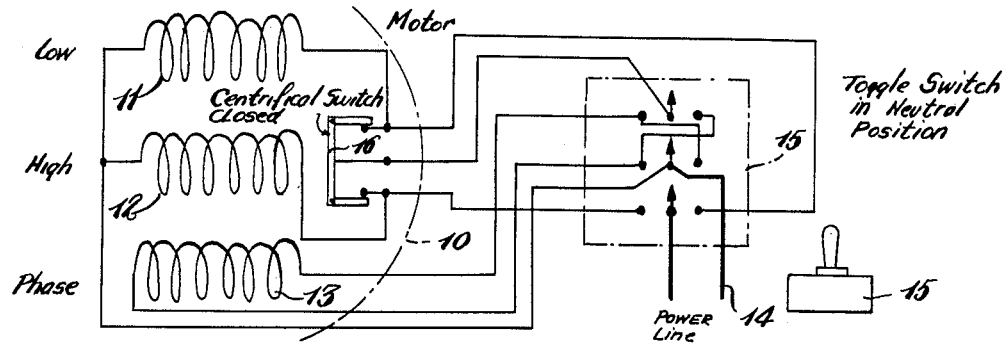
Fig. 1 illustrates the position of the operating switch, circuits and motor windings when the operating switch is in neutral position.
Figure 2:
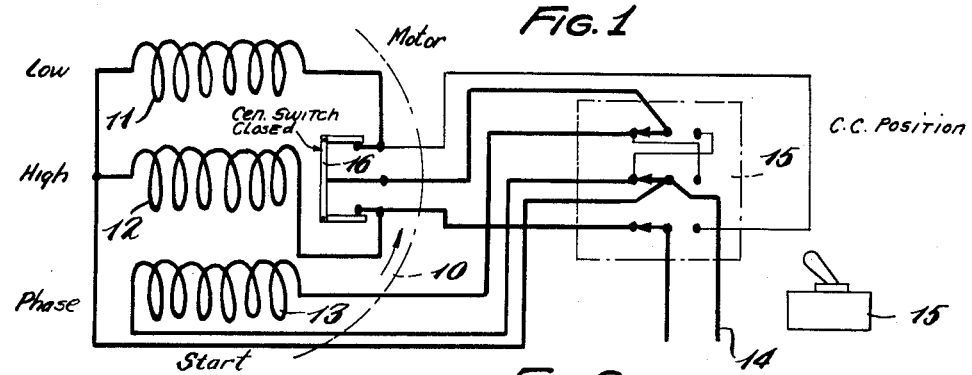
Fig. 2 is a view corresponding to Fig. 1 illustrating the position of the parts when the operating switch is turned to the left at the start of the counterclockwise rotation showing the centrifugal switch closed.
Figure 3:
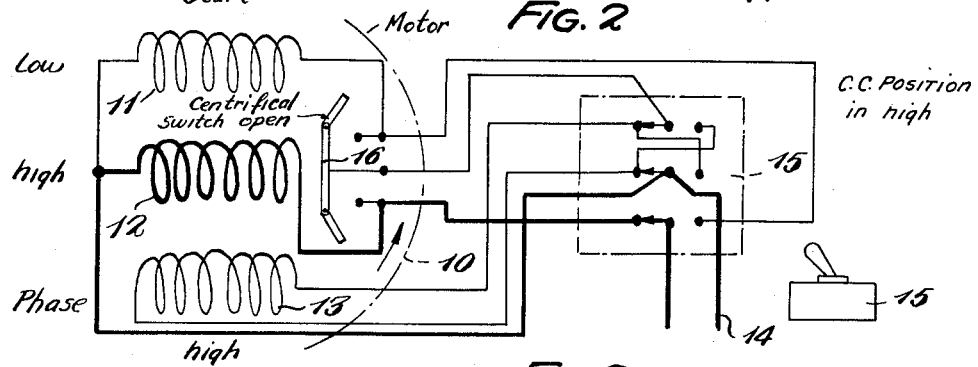
Figure 4:
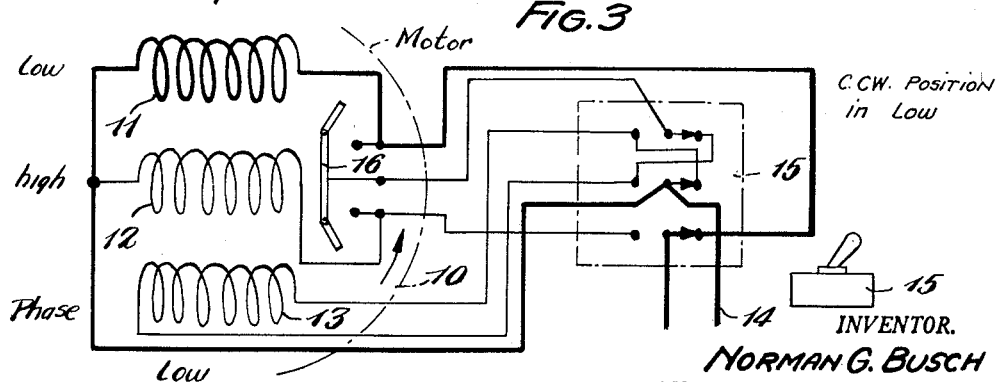
Figure 5:
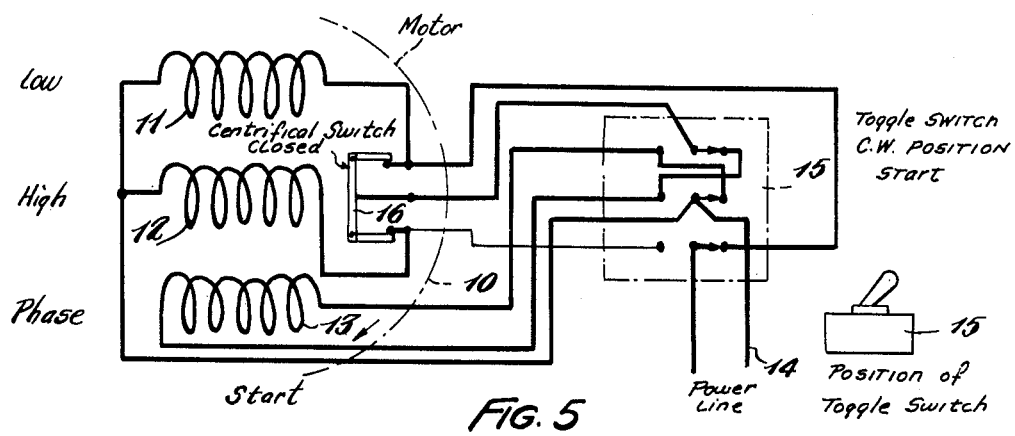
Figure 6:
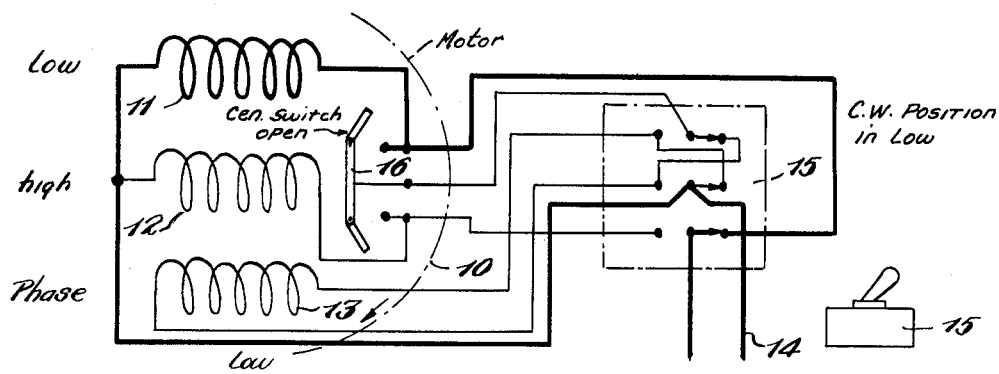
Figure 7:
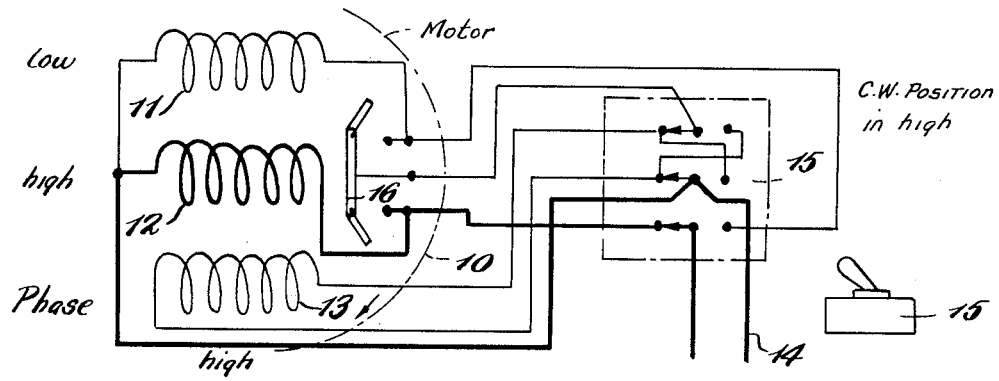

Fig. 3 corresponds to Fig. 2 showing the centrifugal switch open and the motor rotating in high speed;

Fig. 4 illustrates the position of the various parts after the operating switch has been turned to the right but before the centrifugal switch closes, the fan rotating in a counterclockwise direction in low speed;

Fig. 5 illustrates the position of the operating switch, circuits and motor windings, after the operating switch has been turned to the right from its neutral position illustrated in Fig. 1 to cause clockwise rotation;

Fig. 6 corresponds to Fig. 5 and illustrates the position of the parts after the centrifugal switch opens, the direction of rotation being the same as in Fig. 5; while Fig. 7 illustrates the disposition of the parts after the operating switch has been turned from the right illustrated in Fig. 6 before the centrifugal switch closes, continuing clockwise rotation in high speed.

It will be understood that while the invention herein disclosed was developed to operate a fan, it may be used for various other purposes.

My invention relates to a single phase, split-phase induction electric motor, the stator being provided with two sets of windings for two cooperating sets of poles having different numbers of windings, the winding which provides the smaller number of poles providing the higher speed, while the winding having the greater number of poles provides the lower speed. This is a single phase motor and an auxiliary or phase winding is provided for starting the motor, this in effect, temporarily providing a polyphase motor having a small starting torque, which starts rotation of the motor. After the motor has attained a speed of approximately three-fourths of its maximum speed of rotation, an automatic centrifugal switch cuts out this phase winding and the motor continues to operate as a true single phase motor.

Motor speed change is accomplished by shifting from one set of stator poles to another set of poles, this being performed by shifting from one winding to another. This being a single phase motor, as long as it is in motion and the centrifugal switch is open, change of speed can readily be accomplished by operating a mechanical switch, which quickly operated from one position to another merely shifts connections from the high to low speed windings and vice versa, as the phase winding is not brought in until the motor speed drops to a certain predetermined level and closes the centrifugal switch.

The phase winding and the speed or stator windings are connected in parallel in the motor, a switch controlling the same being connected in such manner, that in its various positions it reverses the ends of the starting winding with respect to the ends of the stator or speed winding. By thus reversing the ends of the phase winding, the initial pulse of current is made to pass either in the same direction through the windings, or in the opposite direction through the phase windings, which causes the initial torque to go to the left in one instance and to the right in the other.

In the drawings the numeral 10 illustrates in diagrammatic form the casing of an electric motor of the type and construction above set forth, which includes low speed windings 11, high speed windings 12, and starting or phase windings 13. A power circuit 14 connected to a source of alternating current supplies current to the motor 10 through a manually operated toggle switch 15, connected thereto by suitable electrical conductors, not shown herein. The switch 15 is a double-throw three pole type having its operating position illustrated in a separate view at the right of each figure, while its various circuit-connecting positions are disclosed in each of the figures of the drawings. For convenience in tracing the various circuits and motor windings, the electrically energized circuits are illustrated by the heavy lines, while the non-energized cricuits are illustrated by the light lines.

A centrifugal switch 16, illustrated in its closed position in Figs. 1, 2 and 5 and in its open position in Figs. 3, 4, 6 and 7 is positioned and arranged in such manner that it is closed when the motor is not operating and remains closed after starting the motor 10 until it reaches approximately three-quarters of its maximum speed at which time it cuts out automatically. This type of switch is well known in the art.

Obviously, when the toggle switch 15 is in neutral position, as illustrated in Fig. 1, no current will pass to the motor 10. When, however, the switch 15 is turned to the left as illustrated in Fig. 2 the centrifugal switch 16, low speed windings 11, phase windings 13 and high speed windings 12 are energized, causing the motor to rotate in a counterclockwise direction, as indicated by the arrow. When the motor 10 has acquired approximately three-quarters of its maximum speed, the centrifugal switch 16 will cut off as shown in Fig. 3, and the motor 10 will then continue to rotate in a high speed in a counterclockwise direction using only the high speed motor windings 12.

When the motor is operating as above described and the toggle switch 15 is then turned from its left position illustrated in Fig. 1 before the centrifugal switch 16 again closes, which is at about one-third of its maximum speed, the direction of rotation will remain counterclockwise, but the low speed motor windings 11 will be energized causing the motor to rotate at low speed. Termination of rotation is accomplished by turning the toggle switch 15 to its neutral position illustrated in Fig. 1.

If the operator first turns the toggle switch 15 to the right from its neutral position, as illustrated in Fig. 5, low speed windings 11, high speed windings 12, and phase windings 13 will be energized, the centrifugal switch 16 will be closed and the motor will start to rotate in a clockwise direction. When it attains approximately three-quarters of its top speed, the centrifugal switch 16 will cut out and the motor will continue to rotate in high speed in a clockwise direction.

When the motor is thus operating, and the toggle switch 15 is quickly turned through its neutral position to its right position, illustrated in Fig. 7, before the centrifugal switch 16 again cuts in, the motor 10 will continue to rotate in a clockwise direction and due to the fact that the high speed windings 12 are energized the motor will rotate in high speed. Obviously shifting the switch 15 to its neutral position will cut off the flow of current to the motor to cause it to stop.

Thus it will be understood that by providing a single double throw three pole switch in combination with a centrifugal switch and the circuits and motor windings disclosed herein, that a single switch will provide two different motor speeds and will also provide for change of direction of rotation. This construction is particularly advantageous for operating various types of fans as it provides both directional and speed control in a single switch and thereby reduces the number of parts required and thus provides a relatively cheaper construction.

This invention is also adapted to be used as a capacitor motor having a starting winding which provides more starting torque and requires less starting current. Attention is directed to the feature that the embodiment of this invention in the form illustrated starts the motor in high speed in a counterclockwise direction and in low speed in a clockwise direction. Either of the foregoing speeds may be changed to the other speed by turning the toggle switch quickly through its neutral position before the centrifugal switch closes. This invention eliminates one phase winding and thus lowers manufacturing costs. The same results could be accomplished by using a gang switch, i. e., two switches coupled together.

The present embodiment of the invention is illustrative only and may be variously changed, used or modified without departing from the spirit of the invention or sacrificing the advantages thereof.

I claim:

1. A switching device for use with a single phase, split phase, alternating current induction motor having a starting winding, high and low speed running windings and a centrifugally actuated switch connecting the running windings in parallel when the motor is at rest or operating below a predetermined speed, a single switch means for manually controlling the flow of current to the motor and provided with two operating positions for reversing the ends of the starting winding with relation to the ends of the running windings, and thus controlling the direction of motor rotation when starting the motor, while the motor is rotating said manual switch being connected to one of the running windings when the switch is in one operating position and connected to the other speed winding when in the other operating position, which permits the change in speed of the motor while it is rotating above a predetermined speed by moving the manual switch through the neutral position to the opposite switch position, the connection and arrangement of the foregoing parts permitting both the change in direction of motor rotation and two speeds in each direction by said single switch means.

2. A switching device for use with a single phase, split phase, alternating current induction motor having a starting winding, high and low speed running windings and a centrifugally actuated switch which connects the running windings in parallel when the motor is at rest or operating below a predetermined speed, a double-throw three pole manual switch controlling the flow of current to the motor and provided with two operating positions for reversing the ends of the starting winding with relation to the ends of the running winding, each switch position controlling one direction of motor rotation for changing the direction of motor rotation when starting the motor from rest, while the motor is rotating and said centrifugal switch is open said manual switch being further connected to one of the running windings when the switch is in one operating position and connected to the other speed winding when in the other operating position, which permits the change in speed of the motor while it is rotating above a predetermined speed by moving the manual switch through the neutral position to the opposite switch position before the centrifugal switch cuts in, the connection and arrangement of the foregoing parts permitting both the change in direction of motor rotation and two speeds in each direction by operating said manual switch in the manner described.

References Cited in the file of this patent

UNITED STATES PATENTS

| | | |
|---|---|---|
| 811,644 | Lamme | Feb. 6, 1906 |
| 1,961,793 | Schaefer | June 5, 1934 |
| 1,966,212 | Morrill | July 10, 1934 |
| 2,068,559 | Michelsen | Jan. 19, 1937 |
| 2,069,077 | Michelsen | Jan. 26, 1937 |
| 2,269,069 | Werner | Jan. 6, 1942 |
| 2,579,066 | Codling | Dec. 18, 1951 |